May 18, 1954     E. M. LANIER     2,678,784
AIRPLANE Filed Dec. 23, 1948     6 Sheets-Sheet 1

Inventor,
Edward M. Lanier,
By Albert E. Dieterich,
ATTORNEY.

May 18, 1954     E. M. LANIER     2,678,784
AIRPLANE
Filed Dec. 23, 1948     6 Sheets-Sheet 2

Inventor,
Edward M. Lanier,
By Albert E. Dieterich,
ATTORNEY.

May 18, 1954   E. M. LANIER   2,678,784
AIRPLANE
Filed Dec. 23, 1948   6 Sheets-Sheet 5

May 18, 1954　　　　E. M. LANIER　　　　2,678,784
AIRPLANE
Filed Dec. 23, 1948　　　　　　　　　6 Sheets-Sheet 6

Patented May 18, 1954

2,678,784

UNITED STATES PATENT OFFICE 2,678,784

AIRPLANE

Edward M. Lanier, Croydon, Pa., assignor to Lanier Aircraft Corporation, Newark, N. J.

Application December 23, 1948, Serial No. 66,977

6 Claims. (Cl. 244—42)

My invention relates to improvements in airfoils, and particularly of the type disclosed in Edward H. Lanier patents assigned to Lanier Aircraft Corporation; No. 1,750,529, issued March 11, 1930; No. 1,779,005, issued October 21, 1930; No. 1,813,627, issued July 7, 1931; No. 1,866,214, issued July 5, 1932; and Reissue 19,665 issued August 13, 1935.

One of the objects of the present invention is to provide an airfoil for an airplane having a fixed member and a movable member to define an air passage through the airfoil for improving the flight characteristics of the airplane.

A further object is in the provision of a Venturi passage through the airfoil and between the fixed member and movable member and wherein the movable member is in the form of a scoop or concave, at its lower portion and which movable member is capable of adjustment with respect to the fixed member for varying the size of said passage for improving flight characteristics in landing, take-off, and maximum glide.

Another object of the invention is to provide a chamber in the airfoil to the rear of the air passage, provided with an inwardly movable door, so that an increase or decrease in drag may be had depending on the degree of movement of the door.

Another object of the invention is to provide an airplane that has a higher degree of inherent safety and utility, and which can land and take off from areas comparable to those used by rotary wing aircraft, and also that will fly safely at very slow speed and is stall and spin proof.

A further object is to change the effective camber of the airfoil to increase lift at slow speeds without longitudinal instability as is experienced with flaps; and to make this effective camber variable to create in one wing the aerodynamic characteristics required for all desirable flight conditions.

Another object is in the provision of means to remove the boundary layer from the airfoil.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Figs. 17 and 18 are views similar to Fig. 12 and hereinafter specifically referred to.

Fig. 19 is a detail view of a modification hereinafter particularly referred to.

Fig. 20 is a detail view similar to Fig. 17 but showing a modified wing without a variable top.

Fig. 24 is a detail view of the cable operating lever mechanism.

Figures 1, 16:
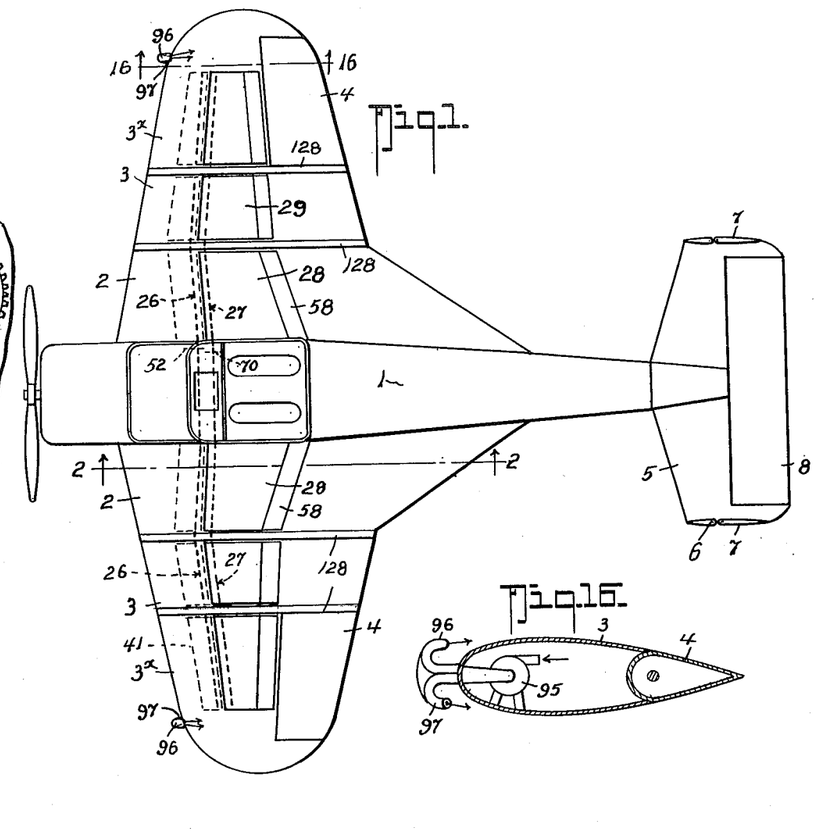
Fig. 1 is a top plan view of an airplane embodying my invention.
Fig. 16 is a detail section on the line 16—16 of Fig. 1.

In the drawings in which like numerals and letters of reference indicate like parts in all the figures, 1 is the fuselage of an airplane having wings composed of airfoils 2 and 3 forming a dihedral angle, 4 are the ailerons, 5 the tailplane, 6 fins, 7 vertical rudders and 8 the horizontal rudder of the airplane.

Figures 2, 7:
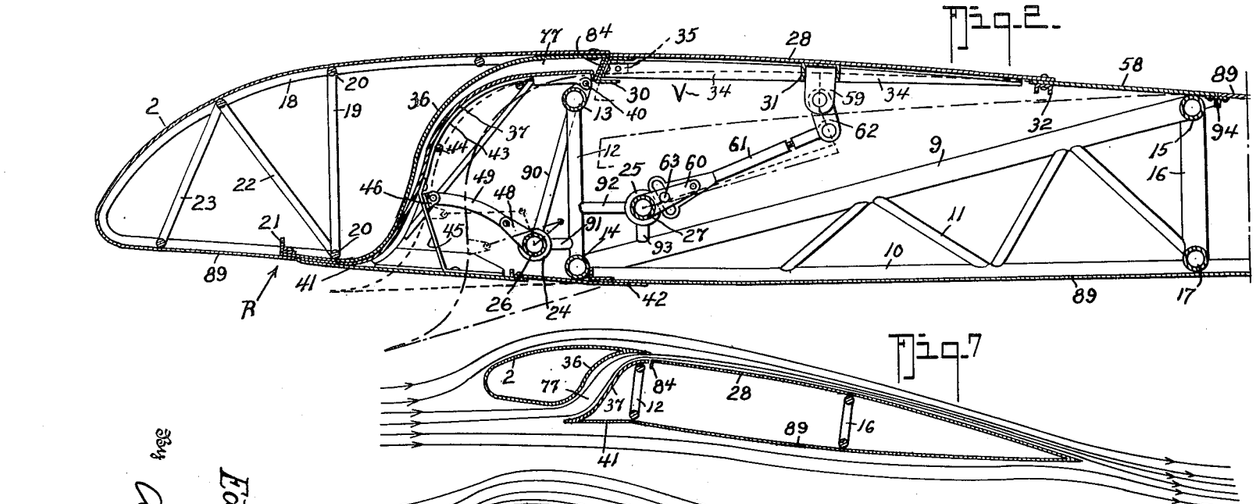
Fig. 2 is an enlarged detail section on the line 2—2 of Fig. 1.
Fig. 7 is a schematic cross sectional view with the airfoil in position for climbing, i. e., with the chamber and vent-scoop partly open.
Figure 3:
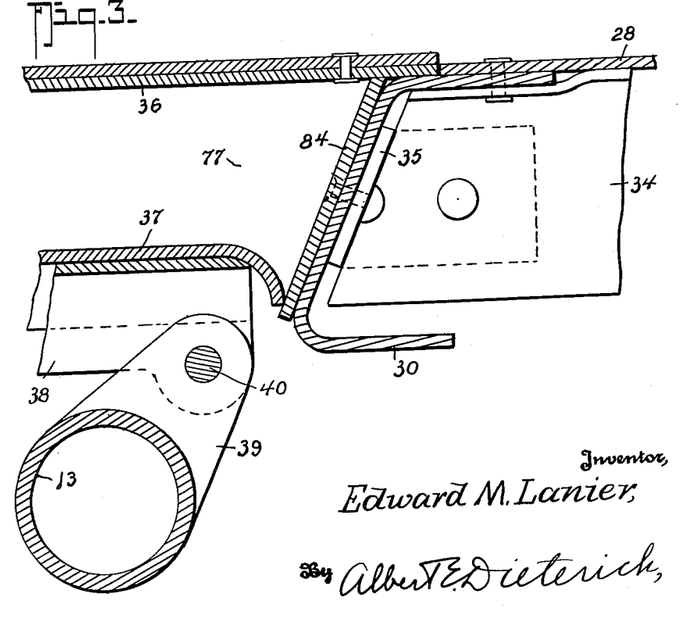
Fig. 3 is an enlarged detail sectional view showing how the door closes the scoop-Venturi outlet.
Figure 4:
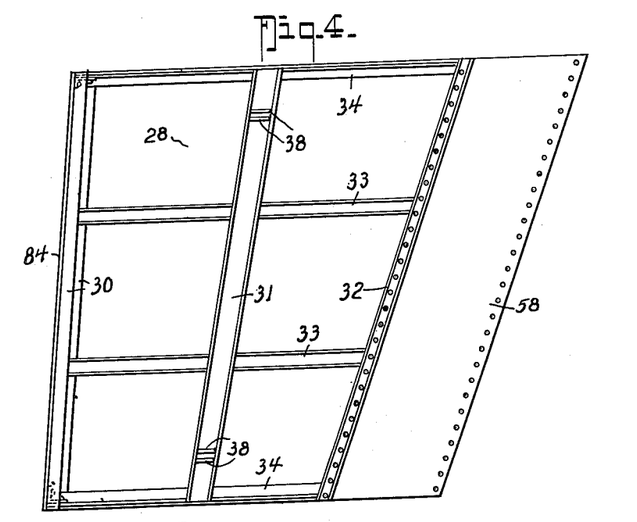
Fig. 4 is an inverted plan view of one of the doors.

Referring now particularly to Figs. 2, 3 and 4 it will be seen that an airfoil includes a suitable frame composed of main bars 12, 13, 14 and 15, 16, 17 and 86, 87, 88, and minor bars 19, 20, nose ribs 18, main diagonal longitudinal bars 9, braces 11 and longitudinal ribs 10. The bars 13 and 14 extend transversely of the airfoil and are connected by the vertical bars 12 to comprise a main spar that is located in the fore part of the airfoil. The bars 15 and 17 extend transversely of the airfoil and are connected by the vertical bars 16 to comprise a second spar that is located aft of the spar 13, 14, 12. The bars 87 and 88 extend transversely of the airfoil and are connected by the vertical bars 86 to constitute a spar to the rear of the first mentioned spars (see Fig. 12). The bars 20 extend transversely of the airfoil and are connected by the vertical bars 19 to comprise a spar in the nose of the airfoil. 21 is an angle to which the front wall 36 of the air vent is riveted together with a part of the skin 89 of the airfoil. 22, 23 are braces in the nose of the airfoil.

Figure 11:
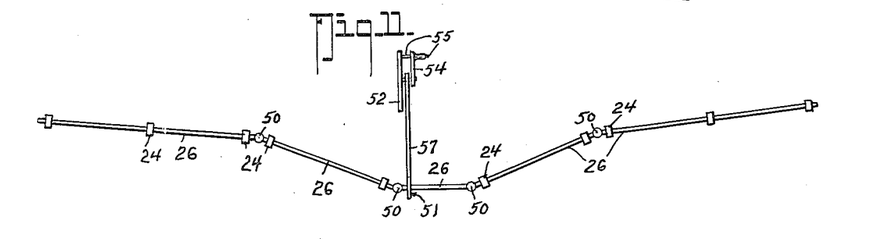
Fig. 11 is a detail, somewhat schematic, elevational view of the air scoop operating shaft and its control.

Bearings 24, suitably braced as at 90, 91 carry an articulated shaft 26 whose sections are connected by universal joints 50 (Fig. 11).

Other bearings 25, suitably braced as at 92, 93, carry an articulated shaft 27 similar in construction to the shaft 26.

28 and 29 are doors, the construction of which is best shown in Figs. 2, 3 and 4 by reference to which it will be seen that the door has a rigid frame composed of transverse channel members 30, 31 and 32, longitudinal channel member 33 and side angle member 34. Corner angles 35 secure the side member 34 to the front channel member 30.

The air vent 77 is formed by a fixed concave-convex front wall 36 secured to the angle 21 and at its upper end to the cover wall or shell 89, and by the front wall of the air scoop formed by the concave-convex rear wall 37 and a bottom plate 41. The wall 37 is secured at its upper end to hinge brackets or elements 38 that are pivoted at 40 to lugs 39 welded to the spar 13, Figures 2 and 3. The bottom plate 41 of the scoop has a flexible extension 42 that overlaps the under surface of the airfoil and closes the gap between wall 37 and spar 14.

The scoop has ribs 43 and spars 44 as shown. A brace 45 connects the wall 37 with plate 41 and has hinge lugs 46 to which and to an arm 48 on shaft 26, a connecting link 49 is attached. The shaft 26 has a sprocket 51, see Figs. 5 and 6, around which and a sprocket 56 on a crank shaft 47 a chain 57 passes. 52 is a stationary plate mounted in the cockpit of the fuselage and having a series of pinholes 53 to receive the latching pin 55 of a crank 54. By turning shaft 47 shaft 26 may be turned to open or close the air scoop as will later more fully appear.

Each door 28 and 29 is provided with a flexible section 58 which is secured to the wing skin angle 84 and acts as a hinge for the door.

Each door has lugs 59 to which links 62 are pivoted.

The shaft 27 has arms 60 that are adjustably pivoted to arms 61 and secured by a bolt and nut at 63 so that when once adjusted arms 60 and 61 act as one.

Arms 61 are pivoted to the links 62 as best shown in Fig. 2.

When the air scoop and the door are to be operated together a stub shaft 64 is provided with a duplex gear, the larger gear 66 of which meshes with a gear 65 on shaft 26 while the smaller gear 67 meshes with a gear 68 on shaft 27, the ratio between shafts 26 and 27 is as 7 to 1, i. e., for a 105° movement of shaft 26 in a clockwise direction shaft 27 will be turned 15°, fully opening air scoop and door.

When air scoop 37 is moved to the dotted line position indicated in Fig. 2, the door 28 will be moved to the position also shown in dotted lines to open fully the outlet end of vent 77. When the scoop is moved to the dot and dash line position in Fig. 2, the door will also assume the dot and dash position indicated in that figure to open fully the chamber V. The air vent or Venturi passage 77 has a jet exit at its upper end where the air issues through the top surface of the airfoil or wing, and this is accomplished by locating the hinge or pivot 40 of the air scoop or wall 37 adjacent the top surface of the airfoil. The jet exit is closed when the doors 28 and 29 are in normal wing contour, and the front plate 84 attached to channel member 30, of the doors, is positioned over the outlet end of the air vent or passage 77.

Figure 5:
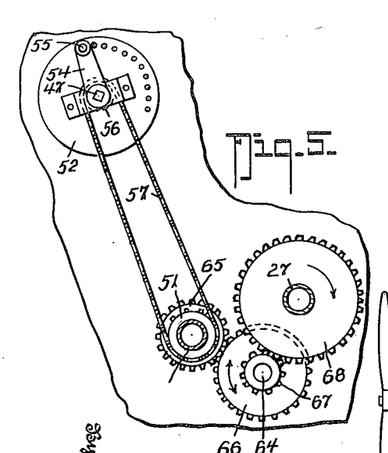
Fig. 5 is a detail elevation and part section showing a single control for the scoop-operating shaft and the door-operating shaft.
Figures 6, 14, 15:
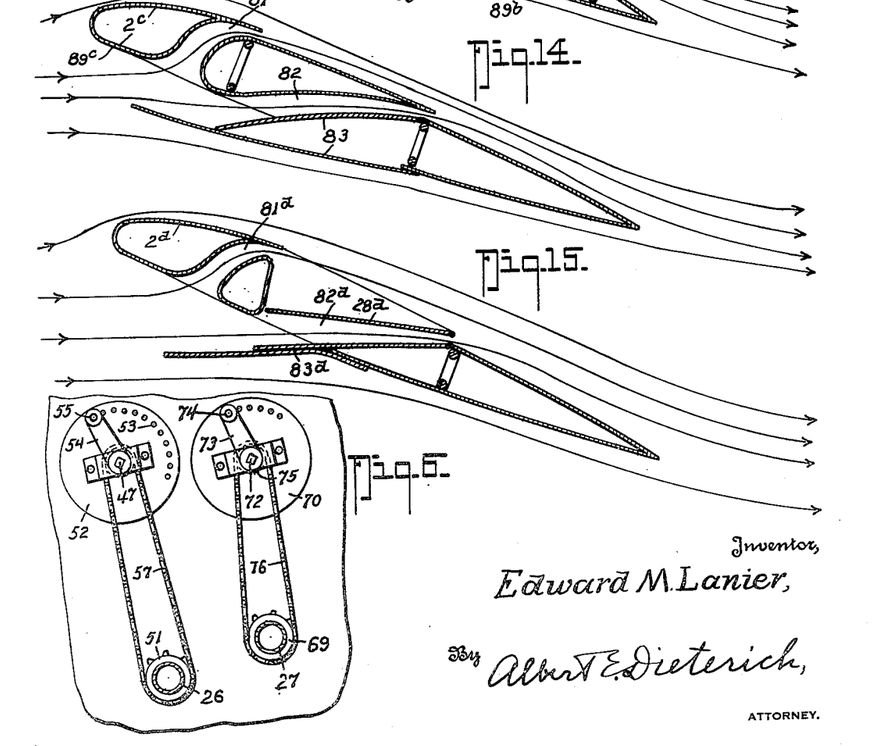
Fig. 6 is a similar view to Fig. 5 showing separate controls for the scoop-operating and door-operating shafts.
Fig. 14 is a similar view of a further modification wherein two vents are controlled by a single air scoop.
Fig. 15 is a similar view of a still further modification wherein a single air scoop controls two vents and wherein the front wall of one air vent is formed by a door.
Figure 8:
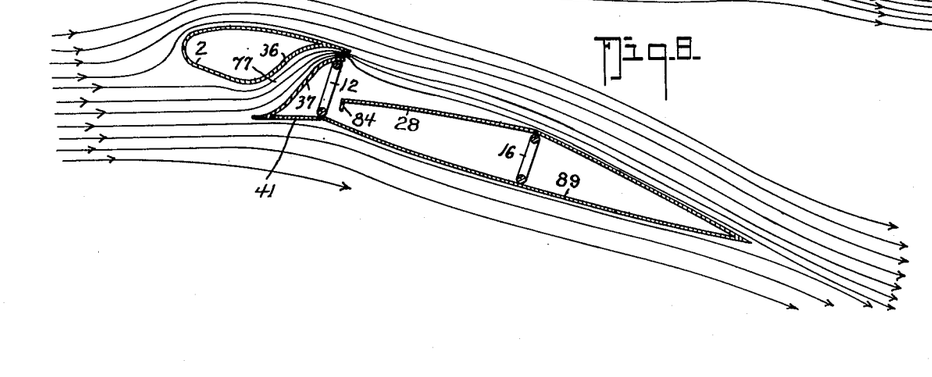
Fig. 8 is a similar view to Fig. 7 showing the position of the parts under landing conditions, i. e., with the wing operating at a high angle of attack and the chamber and vent-scoop fully open.
Figure 9:
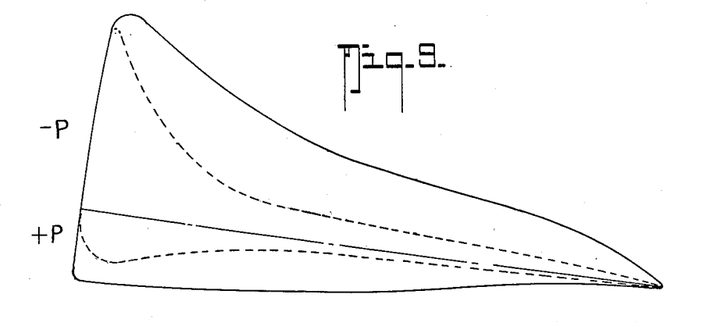
Fig. 9 is a diagrammatic view showing a comparison between the pressure distribution of a conventional airfoil and the expected pressure distribution of the airfoil of my present invention at medium angle of attack.
Figure 10:
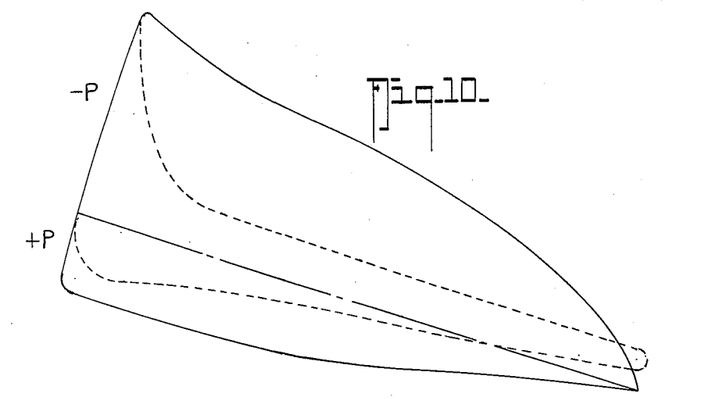
Fig. 10 is a similar view at a high angle of attack.

When the door is to be operated separately from the air scoop the arrangement shown in Fig. 6 may be employed. In this case the shaft 27 is provided with a sprocket 69 over which and a sprocket 75 on a second crank shaft 72 is placed a chain 76. A fixed disc 70 with pin holes 71 is provided to cooperate with the pin 74 of a crank 73 for adjustment purposes or a simple pawl and ratchet held lever device may be employed in lieu of the sprocket and chain device just described, if desired. The arrangement shown in Figure 5 is employed only on machines where it is desirable to operate the air scoop and the door simultaneously, i. e., in combination. The arrangement shown in Figure 6 is used on machines where the scoop and the door may be separately operated by the pilot.

Figures 12, 13:
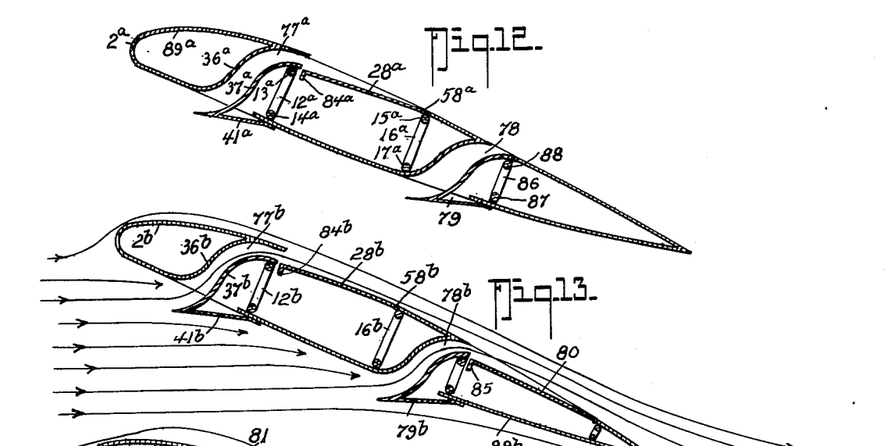
Fig. 12 is a schematic longitudinal sectional view of a modification wherein two vents are provided, two air scoops and one door.
Fig. 13 is a similar view of another modification wherein two vents, air scoops and two doors are employed, the arrows indicating air flow.

If desired the airfoil may be provided with two vents 77$^a$ and 78 one placed to the rear of the other and each controlled by an air scoop 41$^a$ and 79 respectively. One such arrangement is illustrated in Fig. 12 by reference to which it will be seen that only the first or forward air scoop 77$^a$ is associated with a door 28$^a$. In another modification (Fig. 13) is shown an airfoil with two vents 77$^b$ and 78$^b$ each associated with a door 28$^b$, 80 respectively.

In the modification shown in Fig. 14 no doors are employed and two vents 81 and 82 are provided, with both of which a single air scoop 83 cooperates. In Figs. 13 and 14 vents 78$^b$, 81 and 82 have their exit or top ends always open.

In Fig. 15 is shown a modification in which the second vent is formed by the door 82$^d$ that is associated with vent 81ᵈ and the air scoop 83ᵈ which also has provision for controlling the inlet of both vents. The door 82ᵈ may have its control so designed that when the scoop 83ᵈ closes both vent entrances, door 82d will come flush with the top of the airfoil to leave only the exit end of the rear vent 82ᵈ open to atmosphere. The air scoops of all vents may be operated by mechanism similar to that employed in the first embodiment of my invention, so also the doors.

In Figs. 19 to 22 I have shown a cable system for operating the doors. In this system each door is provided with at least one articulated arm device shown in detail in Figs. 21 and 22 by reference to which it will be seen that on a suitable support 100, secured to the spars 13 and 14 is a stud 101 on which is pivotally mounted the hub 102 of a segmental pulley 103 to which hub one element 104 of an articulated arm composed of two parts 104 and 105 pivoted at 106 is rigidly secured. The other element 105 of the arm is pivoted at 107 to one leaf of a hinge 108, the other leaf of which is secured at 109 to the channel beam 30 of the door. Wound around the segmental pulley 103 is an operating cable 110. This cable is wound around the pulley 103 of each door and also passes over idler pulleys 112 to 120 inclusive and has its ends secured to a lever or arm 126 on a rock shaft 127 to which shaft a hand lever 124 is also secured. The rock shaft 127 is supported in a suitable bracket 121 to which bracket a latch arc 122 is also secured and braced as at 123. The lever 125 is provided with a spring loaded latch 125 to engage the latching arc 122. Turnbuckles 111 are provided in the cable at suitable places for an obvious purpose.

Figures 19, 20, 24:
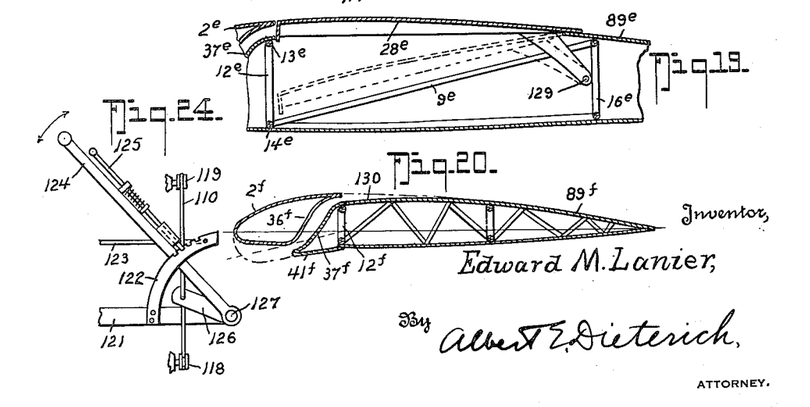
Figure 21:
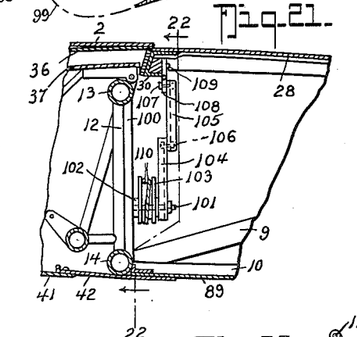
Fig. 21 is a detail vertical section showing a modified means of lowering and raising the doors.
Figure 22:
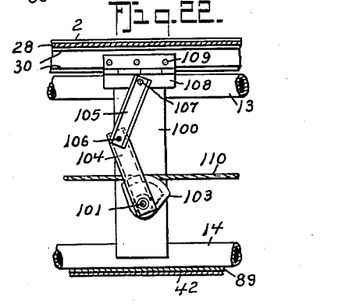
Fig. 22 is a detail section on the line 22—22 of Fig. 21.
Figure 23:
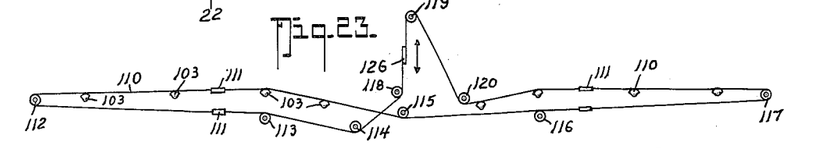
Fig. 23 is a schematic view of a cable system employing the mechanism of Figs. 21 and 22.

Fig. 19 shows the door 28ᵉ hinged on a fixed pivot 129 instead of through the medium of flexible hinge 53 as in the form shown in Fig. 2. In Fig. 19 those parts which correspond to like parts in the previous figures bear the same reference numerals plus the index letter *e* and further description thereof is thought to be unnecessary here.

In Fig. 20 those parts which correspond to like parts in preceding figures bear the same reference numerals plus the index letter *f*. In this figure it will be seen that the top surface of the wing at 130 extends to the lower edge of the vent opening. This figure shows a modified wing without a variable top. It closely resembles a normal wing as the chamber depth is only to the base of the vent exit. This configuration will increase the lift co-efficient at high angles of attack, even when the scoop is closed. This is due to the vent retarding the air from its forward flow over the upper surface. When the scoop is lowered it gives a change in camber and removes the boundary layer similar to the variable chamber arrangements hereinafter described. It does not offer the high speed air brake effect obtained from the variable chamber, however. Neither does it offer the high retarding effect for landings.

The top transverse door may be moved from a closed position (normal wing contour) to a fully open position. It can have numerous settings between the fully opened and fully closed positions. It may operate in conjunction with the air scoop, or independently.

For quick air brake effect at high speeds the door can be operated independently of the scoop. In other words, the scoop will remain closed when the door is lowered. This will give a quick decrease in forward speed. It is accomplished without effecting the longitudinal or lateral stability of the airplane, and without increase in weight or structural strength of the doors or airplane.

The effect of the chamber V on airplanes has been shown by flight testing six airplanes using various configurations and wing designs, plus wind tunnel tests. The scoop, jet and chamber combination creates an airfoil with many variable aerodynamic characteristics. It creates a wing that will give very high lift and high drag, or high lift and low drag, or low drag for high speed conditions, or low lift and high drag for a brake effect. It gives the characteristics of numerous high performance airfoils combined into one variable airfoil.

I believe for take-off and climb the door should be lowered so that the top of the door is adjoining the base of the jet exit, the air scoop being lowered just a part of its total movement. (The arrangement for optimum effects will have to be determined by tests and I do not restrict myself for any single or combination of settings.) For slow steep descent landings I believe the door should have a very low setting with the air scoop fully opened.

On the test airplane incorporating the scoop, jet and chamber the scoop and buffer doors are operated independently, but I do not wish to limit myself to this arrangement. By proper linkage they may operate in conjunction with one another as well as the buffer doors independently.

When the doors 28, 29 and scoops 37 are lowered by the pilot, it opens the Venturi entrance and jet exit into the chamber V. This exit extends below the surface of the normal contour. The Venturi opening is on the bottom contour of the airfoil and forms a scoop when lowered. This air scoop is streamed aft due to the hinge location, design and mechanical motion. The best location is just aft of the airfoils stagnation point. In the test aircraft it is at 13% of the wing chord. When the scoop and door are opened it causes a flow of high pressure air through said venturis with a resultant increase in air volume and air velocity into and over the chamber V and aft thereof, greatly increasing the lift on top and bottom of the airfoil and also preventing a stall within the wide usable range of angles of attack.

The jet exit area remains constant at hinge points throughout the full operation. When the scoop is raised it automatically decreases the overall Venturi size, and closes it when folded flush with the normal wing configuration. The scoop also changes the effective shape and thickness of the airfoil, increasing the effective camber and creating a new airfoil configuration for each setting of the scoop. It creates a pressure head that simulates a very thick nose section of large camber and with a reflex curvature on the bottom of the airfoil aft of the scoop, helping to create delayed stall characteristics for slow speed operation. It creates a highly cambered section, somewhat like a bird's wing, which is known to have high lift at slow speeds and to reach a very high angle of attack before stalling.

The airfoil has a reflexed bottom at the nose. This enables the overall thickness to be less for a given scoop opening. The first opening of the scoop is no lower than the maximum thickness of the airfoil, thereby allowing a flow of air through the venturi and emitted with increased velocity at the jet exit, without increasing the total thickness of the airfoil. This gain in ratio exists between the overall thickness of the airfoil when the scoop is lowered, from the first opening and through the complete movement up to and including the maximum opening. In other words, the area of the scoop opening and resultant positive pressure created at the scoop entrance for a given wing thickness is greater, due to the reflex on the front bottom of the airfoil, plus the location of hinged points and motion of hinged scoop.

The boundary layer develops slowly on the upper airfoil surface to the point of maximum camber. It increases its development from this point rearwardly. The farther aft, the greater its effect on the normal wing. The chamber and scoop jet exit which is located just aft of the maximum camber of the wing, prevents further development of the boundary layer on this area that composes the chamber as well as the area rearward of the chamber. The accelerated air from the scoop jet exit accelerates and sweeps away the slow moving boundary layer that has developed forward of the chamber. The result is increased lift over both the forward and aft portions of the airfoil.

The maximum glide may be increased by lowering the chamber door so that the top surface of the door is at the bottom of the jet exit. This is done in conjunction with the opening of the air scoop slightly, probably not more than the total wing thickness or depth of section aft of the scoop. The reflex under the nose makes this possible. The scoop jet accelerates or breaks up the slow moving boundary layer on the top and the scoop itself tends to break it up on the bottom of the wing. This slow moving boundary layer is from approximately .03 to .06 inch thick and moves up to 94% slower than the free air moving across the wing. It accounts for approximately 50% of the total drag of a plane. The scoop itself will naturally create some drag, but in its low drag location or setting, the drag created is less than the drag eliminated, therefore, increasing the glide of the airplane. Even greater glide would be obtained if the jet exit was located at 70% to 80% of the chord.

It is to be noted that the positive pressure head created by the lowering of the scoops enables a constant positive air pressure available for use at a wide range of positive and negative angles of attack. This eliminates the need for pressure tanks or chemical means to create pressure or suction to remove the boundary layer on the airfoil. The scoop is just aft of the stagnation point on the airfoil and the increased velocity from the separation goes right into the scoop, further increasing positive pressures.

The scoop and chamber creates a constant pressure head at scoop opening and forward of scoop when it is open, regardless of the geometric attitude of the wing. The slope of the lift curve is raised giving the added lift required for slow speed flight in a cruising attitude.

The hinge point of the rigid doors is made of resilient material. It is attached to the rigid door by suitable means so that the door is detachable. It is so fitted that when the door is lowered, the separate hinge fitting forms an arc. This helps to increase the aerodynamic efficiency of the wing, especially aft of this point (see Fig. 2). Another means is shown by Fig. 19 whereby the rigid door is not attached to resilient material, but rotates in an arc due to its hinge location, thereby fairing the rear.

The chamber V is divided into one or more separate chambers (on the plane nearing completion there are three to each wing). These chambers are separated by the longitudinal covered ribs 128. These ribs or vanes help prevent the spread of the tip vortices action inboard, and tend to prevent the travel of a stall condition from one section of the airfoil to another. The chamber tends to prevent washing off of negative pressures from side gusts or slips at very slow speeds and during steep descent. This has been shown by flight testing six different Lanier airplanes. The vanes increase the efficiency in this respect. It is even more effective when the jet is in operation.

It is important to note that the scoop also breaks up the boundary layer on the underside of the wing, greatly increasing the positive pressures, therefore, the lift on the underside of the wing (see Figs. 5, 6, 9 and 10). At the landing angle of the airplane under construction, the scoop bottom is at approximately 1 or 2 degrees positive angle of incidence.

The scoop increases the theoretical camber and depth of the wing and builds up a pressure head forward that keeps the wings entered air going over the nose of the wing as well as through the venturi at very slow airplane speeds and high angles of attack. The result is very high lift at slow speeds, and creating a flat top to its very high lift coefficient curve, thereby preventing the wing from stalling. This coupled with a low wing loading and combined with the stabilizing design and aspect ratio of the airplane gives it the characteristics of a parachute and enables the unskilled pilot to land safely in very limited areas outside of an airport in case of engine failure.

The air scoop jet combination increases the volume and velocity of the air through the venturi. It causes an increase of lift at the lower angles of attack which is not possible with a conventional wing and slot. The conventional slot does not increase the lift until high angles of attack have been reached. In fact the conventional slot reduces lift at the lower angles of attack. The scoop and chamber creates lift at a lower geometric angle. It gives a lower climbing angle due to increased lift being obtained at a lower geometric angle than of wings without said device.

To further increase safety for the unskilled pilot, the new scoop and chamber is to operate in conjunction with the elevator, as well as have independent operation. The air scoop and chamber will both open by proper linkages, when the elevator has been moved by the pilot to a position that creates a resultant wing angle of attack that is approaching the normal airfoils stall point. This will increase the lift and prevent a stall throughout the usable range of angles of attack.

Figure 17:
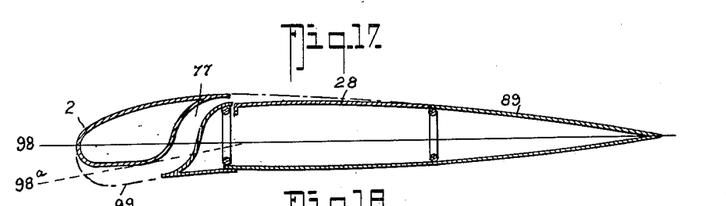
Figure 18:
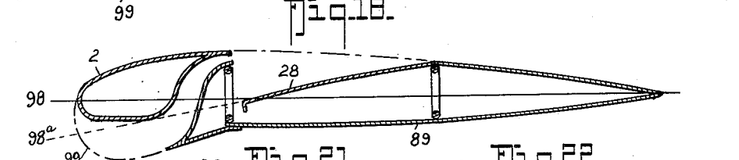

Figures 17 and 18 show the change in effective camber and chord line created by the scoop and doors. I consider the forward location of the scoop very important, due both to its camber changing characteristics and also the location relative to the airfoil's stagnation or separation point, especially at airfoil angles representing a landing angle. Fig. 17 shows the effective areas added to the cross section of the airfoil. The dotted line part 98a of the chord shows the effective chord line of the wing section with the scoop and doors partly open. The solid chord line 98 is that of the basic airfoil section with the scoop and doors closed. The dot and dash line 99 shows the effective shape of the airfoil with the scoop and doors partly closed.

Fig. 18 shows the dot and dash line 99 showing the effective shape of the airfoil with the scoop and doors wide open. The dotted section 98ª of the chord line shows the change in the chord line with the scoop and doors wide open. The wing becomes effectively a higher camber airfoil with consequently higher lift and higher drag coefficients.

Further, it is an object to have the airfoil lift increased by having a greater portion of the total areas on top and bottom of the airfoil produce lift. With a conventional wing, little lift is produced aft of 25% of the wing chord on top or bottom (see dotted lines Fig. 9). The methods described will produce more lift on a much greater portion of the total area, as well as increase the normal lift of the forward 25% (see full lines Fig. 9). This increase in lift will not create longitudinal instability, such as is the case with wing flaps. This is most important due to the extremely slow landing speeds at which the airplane will operate.

It is to be observed that the vent 77 is somewhat the shape of a letter f in cross section and that its exit end is of approximately constant area while the area of its entrant end increases as the scoop opens the entrant end. Thus the air scooped in is condensed into a shallow mass when it leaves the exit over the top of the airfoil.

It is also to be noted that when the air scoop is opened to the dotted position indicated in Fig. 2 the maximum depth of the airfoil is not exceeded. Further the reflex of the airfoil under surface in advance of the vent entrance (see R, Fig. 2) creates a larger entrance opening with less overall airfoil thickness. The opening to the vent is preferably located at approximately 13% of the chord, which is just aft of the airfoil stagnation point. In practice also the exit of the vent 77 in depth equals about one percent of the chord length of the airfoil and the entrant opening at full open position is preferably of a depth equal to about 5% of the chord length.

In Figs. 12 to 15 inclusive those parts which correspond to like or similar parts in preceding figures bear the same reference numerals plus the index letters a, b, c, d, respectively, and need not be re-described.

Further, it is an object to decrease or eliminate wing tip vortices. One or more axial type blowers 95 are enclosed within the airfoil tips. The blower exits 96, 97 extend outside of the wing tip contour. The exit or exits are on the forward portion of the tip with their air flow directed aft (see Fig. 16). The air from the blower or blowers flows in a direction opposite to the motion of the vortices, neutralizing or diminishing their effects and thereby increasing the lift of the wing as a whole, as well as reducing drag.

In order to prevent cross flow of air on the upper surface and to confine a stalled portion of a wing to a local area, longitudinal ribs or internal vanes 128 are employed (see Fig. 1).

What I claim is:

1. In an airplane, an airfoil having an upwardly and rearwardly directed Venturi passage extending through said airfoil from its lower surface to its upper surface, said passage having a large intake opening at the lower surface of said airfoil and a restricted jet opening at the upper surface of said airfoil, a movable concave scoop pivoted to said airfoil and providing one wall of said passage, said concave scoop engaging the bottom surface of said airfoil to form a closure for said Venturi passage, means for moving said concave scoop within said passage for varying the size of said Venturi passage and projecting it beneath said lower surface of said airfoil for directing air into said Venturi passage, a chamber in said airfoil adjacent said restricted jet opening, an inwardly swinging rigid door hinged to the upper surface of said airfoil and normally lying in the same plane with the upper surface of said airfoil and closing said jet opening and of said airfoil and closing said chamber and means for variably moving said door into said chamber and exposing said jet opening to allow air to be projected over said door upon opening said Venturi passage by said scoop to decrease the air pressure on the upper surface of said airfoil.

2. In an airplane, an airfoil having an upwardly and rearwardly directed Venturi passage extending through said airfoil from its under face to and adjacent but short of its upper face, said passage including a fixed front wall and a movable concaved scoop-shaped rear wall, said rear wall being hinged adjacent the upper surface of said airfoil and providing a fixed restricted jet exit for said passage between said rear wall and upper surface of said airfoil, said rear wall having its free end engaging the bottom surface of said airfoil to form a closure for said Venturi passage, means for moving and projecting said concave rear wall through and below the under face of said airfoil for directing air into said Venturi passage, a chamber in said airfoil adjacent said passage jet exit, an inwardly swinging rigid door hinged to the upper face of said airfoil and normally lying in the same plane with the upper face of said airfoil and closing said jet exit and chamber, and means for variably moving said door into said chamber and exposing said jet exit to allow air to be projected over said door upon opening said Venturi passage by said scoop rear wall to decrease the air pressure on the upper surface of said airfoil.

3. In an airplane, an airfoil having a plurality of upwardly and rearwardly directed Venturi passages extending through said airfoil from its under surface to and adjacent its upper surface, said passages each including a fixed front wall and a movable concave scoop rear wall, said rear walls each being hinged adjacent the upper surface of said airfoil and providing a fixed restricted jet exit for each of said passages between said rear walls and said upper surfaces of said airfoil, said concaved scooped rear walls engaging the bottom surface of said airfoil to form a closure for each of said Venturi passages, means for variably moving said concaved rear walls for varying the size of said Venturi passages and projecting said concaved rear walls through and beneath the lower surface of said airfoil for directing air into said Venturi passage, a plurality of chambers in said airfoil adjacent each of said passage jet exits, inwardly swinging rigid doors hinged to the upper surface of said airfoil and normally lying in the same plane with the upper surface of said airfoil and each door closing a jet exit and chamber, and means for variably moving said doors into said chambers and exposing said jet exits to allow air to be projected over said doors upon opening said Venturi passages by said scooped rear walls to decrease the air pressure on the upper surface of said airfoil.

4. An airfoil for an airplane having a fixed front wall extending from the top to the bottom surface and a cooperating movable rear wall hinged adjacent the top surface of said airfoil to define with said fixed front wall an upwardly and rearwardly directed Venturi passage extending from the bottom to the top surface of said airfoil, said rear wall having a concave-convex configuration with the concave portion of the configuration being disposed at the lower portion of the rear wall, said rear wall defining with the top surface of said airfoil a fixed restricted jet exit of a constant cross sectional area for said Venturi passage, said rear wall having the concave portion thereof terminating in a free end engageable with the bottom surface of said airfoil to form a closure for said Venturi passage, and means for moving said rear wall with respect to the fixed front wall to project the free end and the concave portion of said rear wall below the bottom surface of said airfoil to vary the cross sectional area of said Venturi passage while maintaining the jet exit at a constant cross sectional area.

5. An airfoil for an airplane having a fixed front wall extending from the top to the bottom surface thereof, a cooperating movable rear wall hinged adjacent the top surface of said airfoil to define with said fixed front wall an upwardly and rearwardly directed Venturi passage extending from the bottom to the top surface of said airfoil, said fixed front wall being of a concave-convex configuration, said rear wall having a configuration complementary to the fixed front wall with the concave portion of the rear wall being disposed at the lower portion thereof and terminating in a free end engageable with the bottom surface of said airfoil to form a closure for said Venturi passage, said rear wall defining with the top surface of said airfoil adjacent the hinged connection of said rear wall with the airfoil an exit of a constant cross sectional area for said Venturi passage, and means for moving said rear wall with respect to the fixed front wall to project the free end and the concave portion of said rear wall below the bottom surface of said airfoil to vary the cross sectional area of said Venturi passage while maintaining the exit at a constant cross sectional area.

6. An airfoil for an airplane having a fixed front wall of a length to extend from the top to the bottom surface thereof, a cooperating movable rear wall of a length commensurate with the fixed wall and hinged adjacent the top surface of said airfoil to define with said fixed front wall an upwardly and rearwardly directed Venturi passage extending from the bottom to the top surface of said airfoil, said rear wall defining with the top surface of said airfoil an exit for said Venturi passage, said rear wall terminating in a free end portion engageable with the bottom surface of said airfoil at a point beyond the engagement of the bottom end of the fixed wall with said airfoil to form a closure for the Venturi passage, and means for pivotally moving said rear wall throughout its entire length with respect to the entire length of the fixed front wall to project the free end portion of said rear wall below the bottom surface of said airfoil to vary the cross sectional area of said Venturi passage throughout its entire length.

References Cited in the file of this patent

UNITED STATES PATENTS

| Number | Name | Date |
| --- | --- | --- |
| 1,471,243 | Coffin | Oct. 16, 1923 |
| 1,496,732 | Page | June 3, 1924 |
| 1,580,577 | Baumann | Apr. 13, 1926 |
| 1,810,693 | Alfaro | June 16, 1931 |
| 1,822,179 | Thomas | Sept. 8, 1931 |
| 1,857,962 | Lavelle | May 10, 1932 |
| 1,866,214 | Lanier | July 5, 1932 |
| 1,918,897 | Colburn | July 18, 1933 |
| 2,075,817 | Loerke | Apr. 6, 1937 |
| 2,419,161 | Pitt | Apr. 15, 1947 |
| 2,485,218 | Shaw | Oct. 18, 1949 |
| 2,541,565 | Ziegler | Feb. 13, 1951 |

FOREIGN PATENTS

| Number | Country | Date |
| --- | --- | --- |
| 393,074 | Great Britain | June 1, 1933 |
| 419,559 | Great Britain | Nov. 14, 1934 |